US012784398B2

(12) United States Patent
Tang et al.

(10) Patent No.: US 12,784,398 B2
(45) Date of Patent: Nov. 3, 2026

(54) METHODS AND SYSTEMS FOR VIRTUAL HAIR COLORING

(71) Applicant: L'Oréal, Paris (FR)

(72) Inventors: Tsz To Tang, Scarborough (CA); Benzakhar Manashirov, Toronto (CA)

(73) Assignee: L'Oreal, Paris (FR)

( * ) Notice: Subject to any disclaimer, the term of this patent is extended or adjusted under 35 U.S.C. 154(b) by 437 days.

(21) Appl. No.: 18/109,310

(22) Filed: Feb. 14, 2023

(65) Prior Publication Data

US 2024/0273857 A1    Aug. 15, 2024

(51) Int. Cl.

| | |
|---|---|
| ***G06V 10/56*** | (2022.01) |
| ***G06F 3/14*** | (2006.01) |
| ***G06T 1/20*** | (2006.01) |
| ***G06T 5/20*** | (2006.01) |
| ***G06T 5/40*** | (2006.01) |
| ***G06V 10/82*** | (2022.01) |

(52) U.S. Cl.

CPC ................ *G06V 10/56* (2022.01); *G06F 3/14* (2013.01); *G06T 1/20* (2013.01); *G06T 5/20* (2013.01); *G06T 5/40* (2013.01); *G06V 10/82* (2022.01); *G06T 2207/10024* (2013.01)

(58) Field of Classification Search

CPC .......... G06V 10/56; G06V 10/82; G06F 3/14; G06T 1/20; G06T 5/20; G06T 5/40; G06T 2207/10024

See application file for complete search history.

(56) References Cited

U.S. PATENT DOCUMENTS

| | | | | |
|---|---|---|---|---|
| 8,884,980 | B2 * | 11/2014 | Mallick | G06T 11/60 345/593 |
| 10,217,244 | B2 * | 2/2019 | Kowalczyk | G06Q 50/10 |
| 11,069,119 | B1 * | 7/2021 | Anderegg | G06T 15/005 |
| 11,410,345 | B2 * | 8/2022 | Liu | G06T 11/10 |
| 11,861,771 | B2 * | 1/2024 | Alashkar | G06T 11/00 |

(Continued)

FOREIGN PATENT DOCUMENTS

| | | |
|---|---|---|
| CN | 110969631 A | 4/2020 |
| JP | 2021502627 A | 1/2021 |

(Continued)

OTHER PUBLICATIONS

Xu M, Ding Y. Color Transfer Algorithm between Images Based on a Two-Stage Convolutional Neural Network. Sensors (Basel). Oct. 13, 2022;22(20):7779. doi: 10.3390/s22207779. PMID: 36298129; PMCID: PMC9610276. (Year: 2022).*

(Continued)

*Primary Examiner* — Stephen R Koziol
*Assistant Examiner* — Joshua Chen
(74) *Attorney, Agent, or Firm* — Christensen O'Connor Johnson Kindness PLLC

(57) ABSTRACT

There is provided methods and systems for a hair virtual try on. Gray levels from a swatch image and gray levels from a hair portion of an input image are mapped by matching their respective frequencies to establish a map relationship between the swatch image and the hair portion, wherein the gray levels of the swatch image are associated to respective swatch color values. A pixel in the hair portion is colored based on a swatch color value determined using a gray level of the pixel and the map relationship.

18 Claims, 5 Drawing Sheets

(56) References Cited

U.S. PATENT DOCUMENTS

| | | | | |
|---|---|---|---|---|
| 2012/0075331 | A1* | 3/2012 | Mallick | A45D 44/005 345/594 |
| 2019/0294916 | A1* | 9/2019 | Zhang | G06N 3/045 |
| 2020/0320748 | A1* | 10/2020 | Levinshtein | G06N 3/08 |
| 2020/0357178 | A1 | 11/2020 | Lin | |
| 2021/0304455 | A1 | 9/2021 | Liu et al. | |
| 2022/0122299 | A1 | 4/2022 | Levinshtein et al. | |
| 2022/0327749 | A1* | 10/2022 | Liu | G06T 11/10 |

FOREIGN PATENT DOCUMENTS

| | | |
|---|---|---|
| WO | WO 98/21695 A1 | 5/1998 |
| WO | WO 2019/079895 A1 | 5/2019 |

OTHER PUBLICATIONS

Lipowezky, Uri. "Automatic Hair Colorization Using Chromaticity Distribution Matching." 2018 IEEE International Conference on the Science of Electrical Engineering in Israel (ICSEE). IEEE, 2018. (Year: 2018).*

Zhang, Zhao, et al. "Deep color consistent network for low-light image enhancement." Proceedings of the IEEE/CVF conference on computer vision and pattern recognition. 2022. (Year: 2022).*

Anonymous "Array Texture-OpenGL Wiki", Feb. 4, 2023, 3 pages (Year: 2023).*

Namala, Sahithi, Venkata Puneeth Avva, and Mangalraj Mangalraj. "An Intelligent System for hair coloring using UNET and ONNX." 2022 3rd International Conference for Emerging Technology (INCET). IEEE, 2022. (Year: 2022).*

International Search Report and Written Opinion issued Apr. 26, 2024, in PCT/EP2024/053109, 16 pages.

Anonymous "Array Texture—OpenGL Wiki", Feb. 4, 2023, 3 pages.

Anonymous "LearnOpenGL—Textures", Jan. 27, 2023, pp. 1-11.

Alex Levinshtein et al., "Real-Time Deep Hair Matting on Mobile Devices", May 8, 2018, 7 pages.

French Preliminary Search Report issued Jan. 17, 2024, in French Application No. 2305815, 2 pgs.

Ling, J., et al., "Region-Aware Adaptive Instance Normalization for Image Harmonization," Proceedings of the IEEE/CVF Conference on Computer Vision and Pattern Recognition (CVPR), <https://openaccess.thecvf.com/content/CVPR2021/html/Ling_Region—Aware_Adaptive_Instance_Normalization_for-Image_Harmonization_CVPR_2021_paper.html>, Jun. 2021, pp. 9361-9370.

Guo, Zhonghui et al., "Image Harmonization with Transformer," Proceedings of the IEEE/CVF International Conference on Computer Vision (ICCV), <https://openaccess.thecvf.com/content/ICCV2021/html/Guo_Image_Harmonization_With_Transformer_ICCV_2021_paper.html>, Quebec, Oct. 10-17, 2021, pp. 14870-14879.

Notice of Reasons for Refusal mailed Aug. 18, 2026, issued in corresponding Japanese Patent Application No. 2025-550179, filed Feb. 7, 2024, 14 pages.

* cited by examiner

METHODS AND SYSTEMS FOR VIRTUAL HAIR COLORING

FIELD OF INVENTION

The present disclosure relates to image processing and augmented reality and more particularly to methods and systems for virtual hair coloring.

BACKGROUND

Virtual hair coloring aims to provide users with the ability to recolour their hair virtually on a device. Users can choose the target shade they want to apply, and the device outputs an image of the user with the user's hair colored in the chosen shade. This may help users decide on a shade for coloring their hair. Hair, as any other real and organic object, tends to have a lot of details and variation in colors which need to be preserved during the rendering so that the realism is conserved. Any recoloring that removes such details would not look realistic. Moreover, representing a target color for a virtual hair dye is not just identifying a single target color, but defining a range of all shades that this specific target hair dye would have when applied on real hair.

Improved techniques are desired to virtually color hair.

SUMMARY

There is provided a computer-implemented method comprising executing on a processor one or more steps. The method comprises mapping gray levels from a swatch image and gray levels from a hair portion of an input image by matching their respective frequencies to establish a map relationship between the swatch image and the hair portion, wherein the gray levels of the swatch image are associated to respective swatch color values. The method comprises coloring a pixel in the hair portion based on a swatch color value determined using a gray level of the pixel and the map relationship.

The method may further comprise determining the hair portion from the input image via a deep neural network.

The respective frequencies may be probabilities of the gray levels occurring in the swatch image or the hair portion, respectively. The frequencies may be represented by histograms or by cumulative distribution functions.

The method may further comprise calculating a mapping table that maps the gray levels from the hair portion to the swatch color values.

Coloring the pixel of the hair portion may be performed by a Graphics Processing Unit (GPU) using a shader. A shader is software code executed by a GPU to render or otherwise modify an image. For example, a shader may be used to modify any one or more of the level(s) of light, darkness and color of a pixel. The method may further comprise providing the mapping table to the shader using a 1D texture. The method may further comprise interpolating the mapping table.

The method may further comprise preprocessing the swatch image or the input image using a deep neural network to improve accuracy of the coloring of the pixel in the hair portion.

The method may further comprise displaying an output image comprising the input image and the hair portion as colored.

The method may further comprise processing the output image using a guided filter.

The method may further comprise calculating the frequencies of each of the gray levels in the swatch image, and calculating the frequencies of each of the gray levels in the hair portion of the input image.

According to a further aspect of the disclosure, there is provided a system. The system comprises a virtual try on (VTO) rendering pipeline having computational circuitry to color respective pixels in a hair portion of an input image based on respective color values from a swatch image, wherein the respective color values are selected from the swatch image using, for each respective pixel, a gray value of the respective pixel and a mapping relationship to a gray value of the swatch image associated to a respective color value. The system further comprises a user interface component to present an output image comprising the input image and the hair portion as colored.

The system may further comprise a hair detection engine comprising computational circuitry to determine the hair portion from the input image via a deep neural network.

The VTO may comprise a shader to color the respective pixels in the hair portion of the input image.

The system may further comprise a preprocessing component comprising computational circuitry to modify properties of the swatch image using a deep neural network.

The system may further comprise a post-processing component comprising computational circuitry to apply a guided filter to the output image.

According to a further aspect of the disclosure, there is provided a computer-implemented method comprising executing on a processor one or more steps. The method comprises coloring in a virtual try on (VTO) rendering pipeline respective pixels in a hair portion of an input image based on respective color values from a swatch image, wherein the respective color values are selected from the swatch image using, for each respective pixel, a gray value of the respective pixel and a mapping relationship to a gray value of the swatch image associated to a respective color value. The method further comprises presenting in a user interface an output image comprising the input image and the hair portion as colored.

The method may further comprise determining the hair portion from the input image via a deep neural network of a hair detection engine.

The VTO may comprise a shader to color the respective pixels in the hair portion of the input image.

According to a further aspect of the disclosure, there is provided a computer-implemented method comprising executing on a processor one or more steps. The method comprises selecting a swatch gray value from a swatch image based on a probability of a hair gray value occurring in a hair portion of an input image. The method further comprises coloring a pixel in the hair portion of the input image based on a color value from the swatch image associated with the swatch gray value.

BRIEF DESCRIPTION OF DRAWINGS

FIG. 1 is an illustration of a computing environment, in accordance with an embodiment, such as for performing a virtual try on.

DETAILED DESCRIPTION

Figure 1:
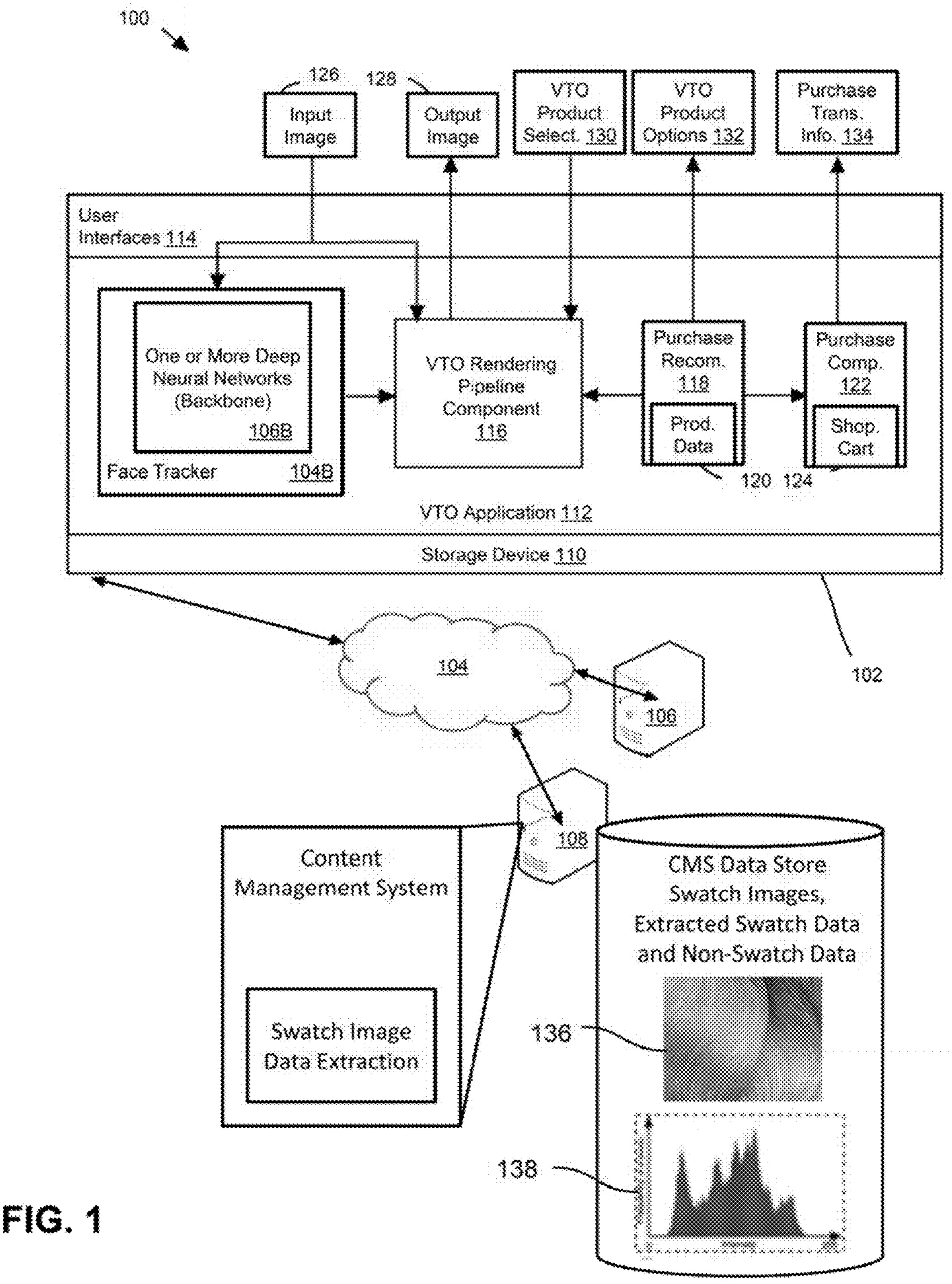

In accordance with embodiments herein, there is described one or more methods, systems, apparatus and techniques for virtual hair coloring in a virtual try on (VTO) application.

Hair VTO may provide users with the ability to recolor their hair virtually on a device using either the camera (live video mode) or a picture (photo mode). The user may choose the target shade they want to apply, and the VTO processes the input (video stream or image) to apply a recolouring method and output the processed image that is shown to the user. In live mode this may happen several times per second with a target of 30 frames per second (FPS) on a mobile device.

At a high level, hair VTO may comprise the following steps: input, detect hair, recolor hair. At the input step the image may be provided to be recolored. In case of a live mode this image may be extracted from the video stream of the camera. Detect the hair may represent the method used to segment the hair in the image from the rest (face, background, etc.) and export a hair mask which will be used to apply the recoloring. Recolor the hair may be the process of replacing each original pixel in the image with a new value from the target color.

Hair as any other real and organic thing tends to have a lot of details and variation in colors which needs to be preserved during the rendering so that the realism is conserved. Any recoloring that would remove such details would not look realistic. Moreover, representing a target color for a virtual hair dye is not just identifying a specific target color, but defining the range of all shades that this specific target hair dye would have when applied on real hair. Usually hair dye brands represent this variety by using hair swatch images. These hair swatch images represent hair (real, synthetic or virtual) with a recoloring applied to it. Unfortunately, there is no market wide standard for hair dye color representation, and each brand is free to use its own classification. In the L'Oréal group, a standard has been defined to evaluate the color of a target shade. This standard uses a notation such as "7,43". The first number (here 7) represents the tone level in a range from 1 (dark) to 10 (blond). The second number (here 4) is optional and represents the primary reflect and defines the overall tone of the color, in a range from 0 to 7. The last number (here 3) is optional and represents the secondary reflect, which is an optional additional color that will enhance, nuance, or lower the intensity of the primary reflect and is in a range from 0 to 7.

However, this target color notation itself can't capture all the details of a resulting color. Hair has a lot of variety in the resulting colors. Much more information is carried by the swatch image than just the tone, primary and secondary reflect. The variety in the resulting color comes from the nature of the hair to reflect or capture the light of the surroundings and is visible as dark areas and bright areas in the image. Failure to represent these areas in a natural way, which includes following the natural hair strands direction, will break the illusion of the recoloring.

Hair VTO is usually used to showcase products and to simulate what would be a realistic and accurate result if the users would dye their hair with the product. There is a distinction to be made between mass market hair dyes and hair salon dyes. Mass market hair dyes are designed to be applied at home by non-specialists and results in a coloration that will change depending on the base color of the user. The packaging of the product usually shows the resulting color applied to different base colors. By contrast, hair salon dyes are meant to be applied by hairdressers who know how to treat the hair before applying the dye and get the specific target color (for example, by bleaching the hair before application). A successful VTO should be able to render both results: color varying depending on the natural hair color of the user versus covering the natural hair to achieve a homogeneous color.

There are a number of constraints on a hair VTO, including the following. The hair VTO should only recolor the hair portion of the input image. The output image produced should be realistic. The hair VTO should be able to recolor the hair in real time (over 20 FPS) on a mobile device. This last constraint has the most impact on the techniques available to recolor the image. While numerous techniques exist to recolor images, none of them are fast enough to be applied in real time on a mobile device.

One known technique involves shifting the hue (H), saturation (S) and lightness (L) of the input image. While this technique is easy to implement, it can't significantly change the brightness of the image, so the degree to which a person's hair color can be changed is limited. It also doesn't capture the full range of color in the target color as it only uses HSL values and not a swatch image.

Another known technique involves applying a semi-transparent colored layer on top of the hair. In this technique the hair mask is used to define a shape that is filled with a semi-transparent texture representing the target color. While this technique is fast to implement and run, preserving the natural hair texture is difficult and requires lowering the intensity of the layer which prevents this technique from rendering vibrant colors.

VTO Application

FIG. 1 is an illustration of a computing environment 100, in accordance with an embodiment, such as for practicing one or more method aspects. Computing environment 100 shows a user computing device 102, such as a smartphone, a communications network 104, a server 106 and a server 108. Communications network 104 comprises wired and/or wireless networks, which may be public or private and may include, for example the internet. Server 106 comprises a server computing device such as for providing a website. Server 108 comprises a server computing device such as for providing e-commerce transaction services. Though shown separately, the servers 106 and 108 can comprise one server device. Computing environment 100 is simplified. For example, not shown are payment transaction gateways and other components such as for completing an e-commerce transaction.

Computing device 102 comprises a storage device 110 (e.g., a non-transient device such as a memory and/or solid state drive, etc.) for storing instructions that, when executed by a processor (not shown), cause the computing device 102 to perform operations such as a computer implemented method. Storage device 110 stores a virtual try on application 112 comprising components such as software modules providing, a user interface 114, face tracker 1048 with one or more deep neural networks 106B, a VTO rendering pipeline component 116, a product recommendation component 118 with product data 120, and a purchasing component 122 with shopping cart 124 (e.g. purchase data).

In an embodiment, VTO application is a web-based application such as is obtained from server 106. Though not shown, user device 102 may store a web-browser for execution of web-based VTO application 112. In an embodiment, VTO application is a native application in accordance with an operating system (also not shown) and software development requirements that may be imposed by a hardware manufacturer, for example, of the user device 102. The native application can be configured for web-based communication or similar communications to servers 106 and 108, as is known.

FIG. 1 shows various input and output data or information associated with a use of VTO application 112, for example. Such includes an input image 126 of the user to be processed for a VTO experience, an output image 128 to which product effects are simulated providing a VTO experience, a VTO product selection 130 comprising user input selecting one or more product effects to be simulated, VTO products options 132 comprising options for products to be virtually tried on, for example for selection by a user of device 102, and purchase transaction information 134 comprising purchase information provided to and/or received from a user to purchase a product.

In an embodiment, via one or more of user interfaces 114, VTO product options 132 are presented for selection to virtually try on by simulating effects on an input image 126. In an embodiment the VTO product options 132 are derived from or associated to product data 120. In an embodiment the product data can be obtained from server 106 and provided by the product recommendation component 118. Though not shown, user or other input may be received for use to determine product recommendations. The user may be prompted, such as via one of interfaces 114 to provide input for determining product recommendations. In an embodiment, the product recommendation component 118 communicates with server 106. Server 106, in an embodiment, determines the recommendation based on input received via component 118 and provides product data accordingly. User interface 114 can present the VTO product choices, for example, updating the display of same responsive to the data received as the user browses or otherwise interacts with the user interface.

In an embodiment, the one or more user interfaces provide instructions and controls to obtain the input image 126, and VTO product selection input 130 such as an identification of one or more VTO products to try on. In an embodiment, the products may be recommended to a user. In an embodiment, the products may be selected by a user without having been recommended per se. That is, instances of the products may be presented such as from a data store of products and the user selects an instance to virtually try on. In an embodiment, the input image 126 is a user's face image, for example, including hair for a hair-related VTO, which can be a still image or a frame from a video. In an embodiment, the input image 126 can be received from a camera (not shown) of device 102 or from a stored image (not shown). The input image 126 is provided to face tracker 104B such as for processing to detect objects in the input image 126 using one or more deep neural networks 106B. In an example, the network classifies, localizes or segments for a hair portion in the image.

In an embodiment, output (not shown) from the face tracker 104B, such as classification results, localization results or segmentation results for one or more detected objects, is provided to VTO rendering pipeline component 116. In an example, the output may comprise a hair mask. The input image 126 is also provided (e.g. made available) to component 116. The VTO product selection 130 is also provided to component 116 for determining which effects are to be rendered. In an embodiment related to makeup simulation, one or more effects can be indicated such as for any one or more of the product categories comprising: lip, eye shadow, eyeliner, blush, etc. In a hair-only VTO embodiment, only a hair effect is applied.

VTO rendering pipeline component 116, in an embodiment, determines whether to render one or more product effects to the input image 126 to simulate a try on. In an embodiment such as one that is related to makeup, for example, responsive to facemask classification output, VTO rendering pipeline component 116 can determine not to render a product effect to all or a portion of a face, for example, because a mask is detected. When a facemask is detected, for example, VTO rendering pipeline component 116 can trigger the user interface 414 to ask the user to remove the facemask. A new image can be received and processed by face tracker 104B. In an embodiment, images are continuously received as a component of a live stream (e.g. a selfie video).

For example, in an embodiment where more than one product effect is to be applied to the input image, the VTO rendering pipeline component 116 may render effects (e.g. on or to) for the input image 126 such as by drawing (rendering) effects in layers, one layer for each product effect, to produce output image 128. Layering may be assisted by use of overlays in some examples. Some examples may change pixel values of the input image itself without overlaying, per se.

Portions of the operations of VTO rendering pipeline component 116 (e.g. such as for drawing the layers) can be performed by a graphics processing unit, in an embodiment. The rendering is in accordance with product data 120 as selected by VTO product selection 130 and is responsive to the location of detected objects. For example, a VTO product selection of a lipstick, lip gloss or other lip related product invokes the application of an effect to one or more detected mouth or lip-related objects at respective locations. Similarly a brow related product selection invokes the application of a selected product effect to the detected eye brow objects. Typically, for symmetrical looks, the same brow effects are applied to each brow, the same lip effect to each lip or the same eye effect to each eye region, but this need not be the case. In an example, the rendering is applied to a region that is relative to the detected objects, such as adjacent one or more such detected objects. Some VTO product selections comprise a selection of more than one product such as coordinated products for brows and eyes or other combinations of detected objects. VTO rendering pipeline component 416 can render each effect, for example, one at a time until all effects are applied. The order of application can be defined by rules or in the selection of products e.g. lipstick before a top gloss.

In an embodiment where an occluding object is detected and the location is determined, for example, as represented in a segmentation mask, the rendering can be responsive to such a segmentation mask. Rendering of an effect can be applied to portions of the face that are not occluded. A segmentation mask can indicate the pixels of the face that are available to (e.g. may) receive an effect such as a makeup effect and those pixels that are not available to receive an effect.

User interfaces 114 provide the output image 128. Output image 128, in an embodiment, is presented as a portion of a live stream of successive output images (each an example 128) such as where a selfie video is augmented to present an augmented reality experience. In an embodiment, output image 128 is presented along with the input image 126, such as in a side by side display for comparison. In an embodiment, output image 128 can be saved (not shown) such as to storage device 110 and/or shared (not shown) with another computing device.

In an embodiment, (not shown) the input images comprise input images of a video conferencing session and the output images comprise a video that is shared with another participant (or more than one) of a video conferencing session. In an embodiment the VTO application is a component or plug in of a video conferencing application (not shown) permitting the user of device 102 to wear makeup during a video conference with one or more other conference participants.

Hair VTO

Figure 2:
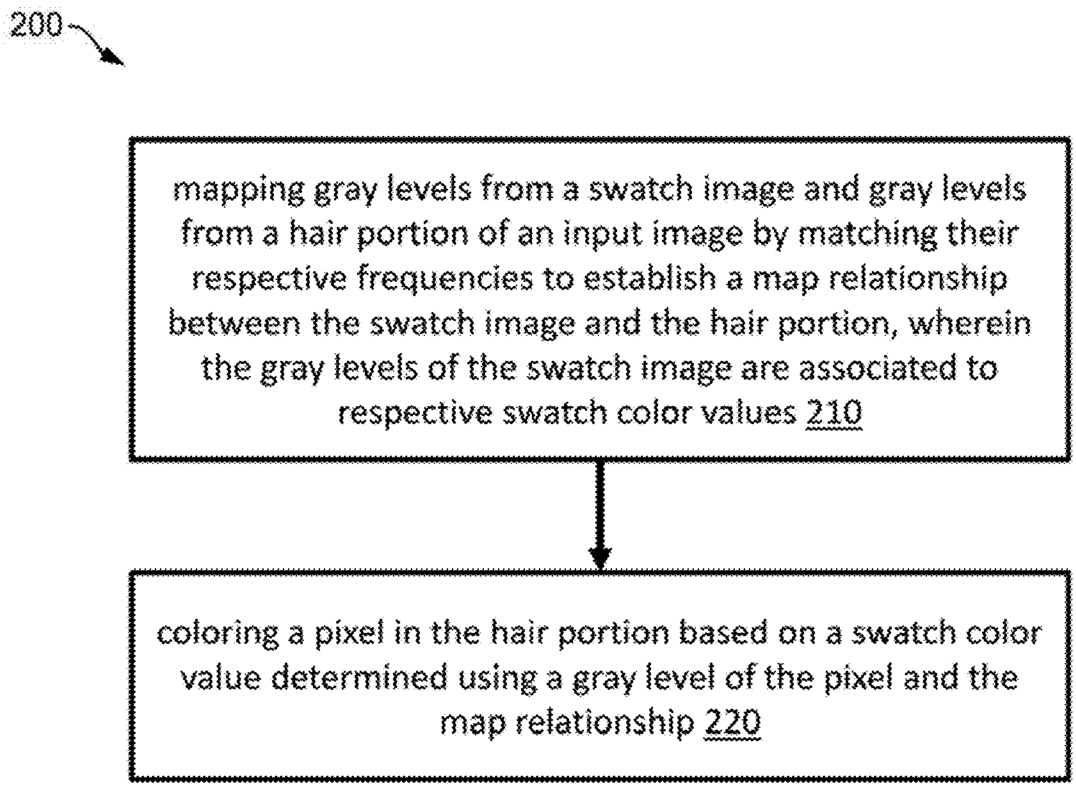
FIG. 2 is a flowchart of operations such as for a computer implemented method in accordance with an embodiment.

Reference is now made to FIG. 2, which shows a computer-implemented method 200 comprising executing on a processor one or more steps. The method 200 comprises mapping gray levels from a swatch image 136 and gray levels from a hair portion of an input image 126 by matching their respective frequencies to establish a map relationship between the swatch image 136 and the hair portion, wherein the gray levels of the swatch image 136 are associated to respective swatch color values 210.

The gray levels of the swatch image 136 and the hair portion of the input image 126 may be mapped by their frequency (that is the most frequent gray level of the swatch image 136 may be mapped to the most frequent gray level of the input image 126). A mapping relationship may be established between the two images. The respective frequencies may be probabilities of the gray levels occurring in the swatch image 136 or the hair portion, respectively. A color mapping may be established that associates any color in an image to a gray level. As such, the distribution of gray levels of the input image 126 may be used as a lookup index to retrieve a corresponding color in the swatch image 136.

The frequencies may be represented by histograms or by cumulative distribution functions. A Cumulative Distribution Function (CDF) is the cumulative probability that a gray value (between 0 and 255) appears in the image, normalized over the total number of pixels in the image to get a result between 0.0 and 1.0. The colors may be represented using RGB, according to which each color is represented by three values between 0 and 255. Other methods of representing colors may also be used. The CDF may be represented as a histogram. The method 200 may comprise calculating the frequencies of the gray levels in the hair portion of the input image 126. The method 200 may comprise calculating the frequencies of the gray levels in the swatch image 136. The method 200 may comprise calculating the frequencies of the swatch color values in the swatch image 136 and associating the swatch color values to gray values in the swatch image 436 based on the frequencies.

$CDF_{swatch}$ may be the cumulative gray histogram of the swatch image 136, normalized between 0.0 to 1.0. $CDF_{user}$ may be the cumulative gray histogram of the hair portion of the input image 126, normalized between 0.0 to 1.0. $H_{swatch,c}$ may be the per channel histogram of the swatch, where c is {r, g, b} and each bin is normalized between 0 to 255.

Figure 3:
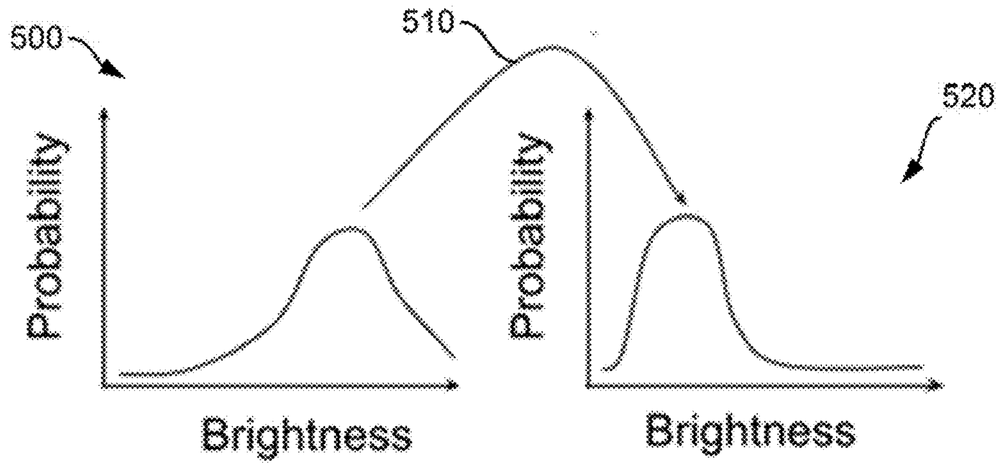
FIG. 3 is an illustration of a representative histogram mapping, in accordance with an embodiment.

The objective may be to find the gray value in the swatch image 136 ($G_{swatch}$) that corresponds to the gray value in the hair portion of the input image 126 ($G_{user}$). That is, the objective is to find $G_{swatch}$ such that $CDF_{user}(G_{user})=CDF_{swatch}(G_{swatch})$. This can be done by calculating $G_{swatch}=CDF^{-1}{}_{swatch}(CDF_{user}(G_{user}))$. Mathematically, the inverse doesn't exist unless the CDF is strictly monotonically increasing, but an inverse can still be defined by choosing the lowest X value if a Y value maps to multiple X values. Reference is now made to FIG. 3, which shows the mapping relationship between the two histograms. The first histogram 500 represents the distribution of gray values in the hair portion of the input image 126. The second histogram 520 represents the distribution of gray values in the swatch image 4136. The arrow 510 represents the mapping relationship for a particular gray value. The gray value with a particular frequency or probability in the hair portion input image 126 may be mapped to the gray value with the same frequency or probability in the swatch image 136. $G_{swatch}$ may then be used to index into $H_{swatch,r}$, $H_{swatch,g}$, $H_{swatch,b}$, which gives the color value associated with that gray value in the swatch image 436. The function $H_{swatch}(CDF^{-1}{}_{swatch}(CDF_{user}(G_{user})))$ provides the mapping relationship between gray values in the hair portion of the input image 426 to color values in the swatch image 136.

The method 200 further comprises coloring a pixel in the hair portion based on a swatch color value determined using a gray level of the pixel and the map relationship 220. For each pixel in the hair portion of the input image 126, the mapping relationship $H_{swatch}(CDF^{-1}{}_{swatch}(CDF_{user}(G_{user})))$ may be used to lookup a swatch color in the swatch image 136. This swatch color may then be used to color the pixel in the hair portion of the input image 126. This swatch color may be blended with the initial pixel color (depending on the desired result and lighting conditions). As a result, the hair portion of the input image 126 may be recolored to resemble the hair color in the swatch image 136.

Figure 4A:
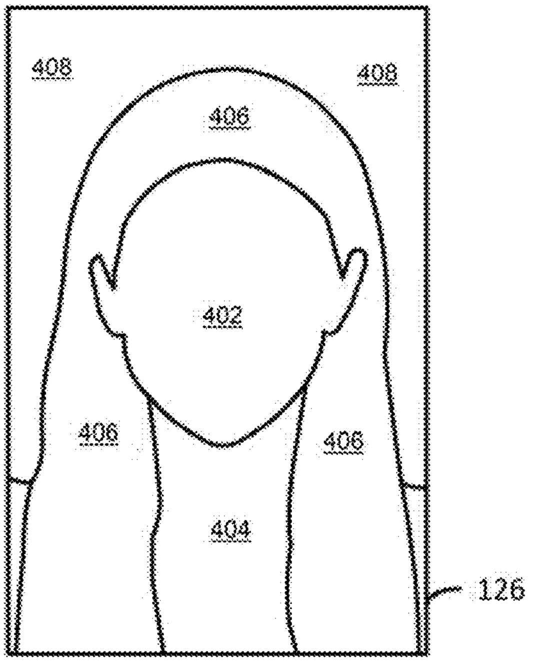
FIG. 4A is an illustration of a representative image of a face input image including a hair portion, in accordance with an embodiment.
Figure 4B:
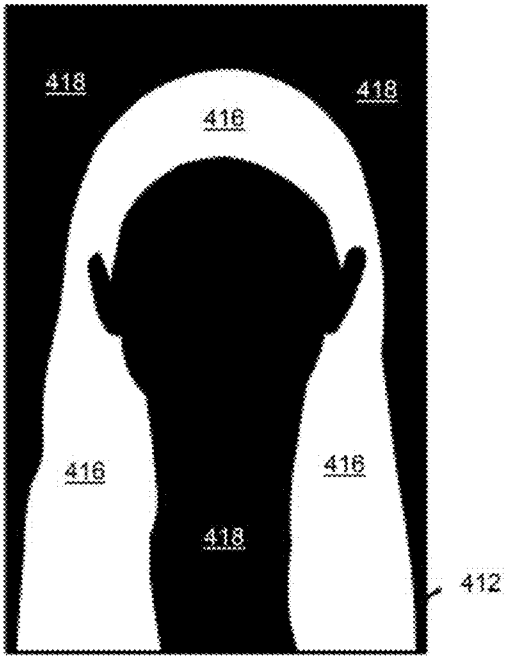
FIG. 4B is an illustration of a representative image of a hair mask, in accordance with an embodiment.

The method 200 may further comprise determining the hair portion from the input image 126 via a deep neural network 1068. Reference is now made to FIG. 4A, which shows a representative example of an input image 126 showing a face of a user. The input image 126 may comprise a face portion 402, a neck portion 404, a hair portion 406, and a background portion 408. Reference is now made to FIG. 4B, which shows an example of a hair mask 412 produced by the neural network 106B. The neural network 1068 takes the input image 126 as an input and identifies the hair portion 406 from the other portions of the input image 126 to produce a hair mask 412. The hair mask 412 may comprise two portions: a hair portion 416 and all other portions 418. The hair mask 412 may distinguish the two portions 416 and 418 by coloring them different colors, such as white and black. The hair mask 412 may be used to identify the pixels in the input image 126 that belong to the hair portion 406.

The method 200 may further comprise calculating a mapping table that maps the gray levels from the hair portion 406 to the swatch color values. The mapping table may map gray values to swatch color values. The mapping table may be calculated by identifying a swatch color value for each possible gray value using the mapping relationship. For example, if RGB colors are used, the mapping table may be an array containing RGB elements and indexed by a gray value. That is the array may contain 256 elements, each element containing an RGB swatch color value indexed by a gray value. Coloring a pixel from the hair portion 406 of the input image 126 may involve determining the gray value of the pixel from the hair portion 406, using the gray value as a lookup index into the mapping table, and using the swatch color value at the specified index of the mapping table to recolor the pixel in the hair portion 106.

Coloring the pixel of the hair portion may be performed by a Graphics Processing Unit (GPU) using a shader. Using a GPU may improve the efficiency of coloring the hair portion 406, for example for real-time coloring of the hair portion 406 in a video stream. The method 200 may further comprise providing the mapping table to the shader using a 1D texture. The table may be stored in a 1D texture and passed into the shader as a uniform. A uniform is a type of variable in a shader that can be available at any stage of the rendering pipeline in the GPU. Since some devices don't support array inputs of the size of the mapping table, this enables the use of the method 200 on such devices. The method 200 may further comprise interpolating the mapping table. Because the GPU can interpolate textures, the lookup table may be interpolated to smooth the resulting color of each pixel, providing a more accurate and realistic output image 128.

The method 200 may further comprise preprocessing the swatch image 436 or the input image 126 using a deep neural network 106B to improve accuracy of the coloring of the pixel in the hair portion 106. The accuracy of the resulting color in the output image 128 may depend on the quality of the input swatch image 136. Unfortunately there is no standard of quality for generating the swatch image 136, and each brand is free to modify the image for their own purposes. A number of parameters of the swatch image 136 may be modified to obtain a more consistent result:

- Brightness Scale: This controls an overall brightness effect that will brighten or darken all the pixels in the image.
- Brightness Boost: This controls a brightness boost that will make the bright pixels more bright but won't change the dark pixels.
- Contrast Scale: This controls an overall contrast effect.
- Saturation Boost: This controls the saturation of the image by boosting further saturated colors, while not changing the unsaturated ones.
- Brightness Cut-off: This controls the cut-off of the brightest values in the histogram data (same as a low-pass filter).
- Darkness Cut-off: This controls the cut-off of the darkest values in the histogram data (same as a high-pass filter).
- Hue Rotate: Slightly rotates the hue of the original image.

Adjusting these parameters before extracting the histogram data from the swatch image 136 may improve the accuracy of the hair rendering. These parameters may be adjusted manually. Alternatively, a neural network (e.g. one of networks 106B, or another) may be trained to adjust these parameters.

The method 200 may further comprise displaying an output image 128 comprising the input image 126 and the hair portion 406 as colored. The output image 128 may be displayed, for example, on a user interface 114 of the user computing device 102.

The method 200 may further comprise processing the output image 128 using a guided filter. When extracting the pixels corresponding to the hair portion 406 in the input image 126 in order to create the hair mask 412, the neural network 106B may include rough edges with a high amount of alpha transparency. This issue may lead to bleeding of the color onto the immediate environment surrounding the hair, resulting in a halo effect. In order to fix this issue, several image processing techniques may be used, however most of them introduce other artifacts and/or are too slow to be applied on video stream processing at a frame rate compliant with a live VTO. One solution is to use a post-processing step (after the neural network model 106B has run) to recalculate better edges by using a guided filter as a matting solution. By using the original input image 126 as a guide for the hair mask image 412, the guided filter can smooth the edges of the hair mask 412 while limiting the bleeding of the colors outside of the original hair position.

The method 200 may further comprise calculating the frequencies of each of the gray levels in the swatch image 136, and calculating the frequencies of each of the gray levels in the hair portion 406 of the input image 126. The frequencies may comprise the histogram data or CDF. The frequencies may be converted to probabilities in a range from 0 to 1. The frequencies of the swatch image 436 may be calculated once each time a swatch image 136 is selected. In a real-time video stream, the frequencies of the input image 126 may be calculated for each frame.

The method 200 may be implemented on a system 100. The system 100 may comprise a user computing device 102, which may comprise a VTO rendering pipeline 116 having computational circuitry to color respective pixels in a hair portion 406 of an input image 126 based on respective color values from a swatch image 136, wherein the respective color values are selected from the swatch image 136 using, for each respective pixel, a gray value of the respective pixel and a mapping relationship to a gray value of the swatch image 136 associated to a respective color value. The user computing device 102 of the system 100 may further comprise a user interface component 114 to present an output image 128 comprising the input image 126 and the hair portion 406 as colored.

The system 100 may further comprise a hair detection engine comprising computational circuitry to determine the hair portion 406 from the input image 126 via a deep neural network 1068. The hair detection engine may be a component of the user computing device 102 or the server 106/108 (not shown).

The user computing device 102 may comprise a GPU, and at least some of the VTO rendering pipeline 116 may be executed by the GPU. In particular, a shader of the GPU may color the respective pixels in the hair portion 406 of the input image 126.

The system 100 may further comprise a preprocessing component comprising computational circuitry to modify properties of the swatch image 136 using a deep neural network 1068. The preprocessing component may be a component of the user computing device 102 or the server 106/108.

The system 100 may further comprise a post-processing component comprising computational circuitry to apply a guided filter to the output image 128.

The server 108 may comprise a CMS data store for storing the swatch image 136 and the frequency or histogram data 138 for the swatch image 136. The server 106/108 may calculate the frequency or histogram data for the swatch image 136. Alternatively, the user computing device 102 may calculate the frequency or histogram data for the swatch image 136 and the input image 126. The server 106/108 may calculate the frequency or histogram data for the input image 126.

Figure 5:
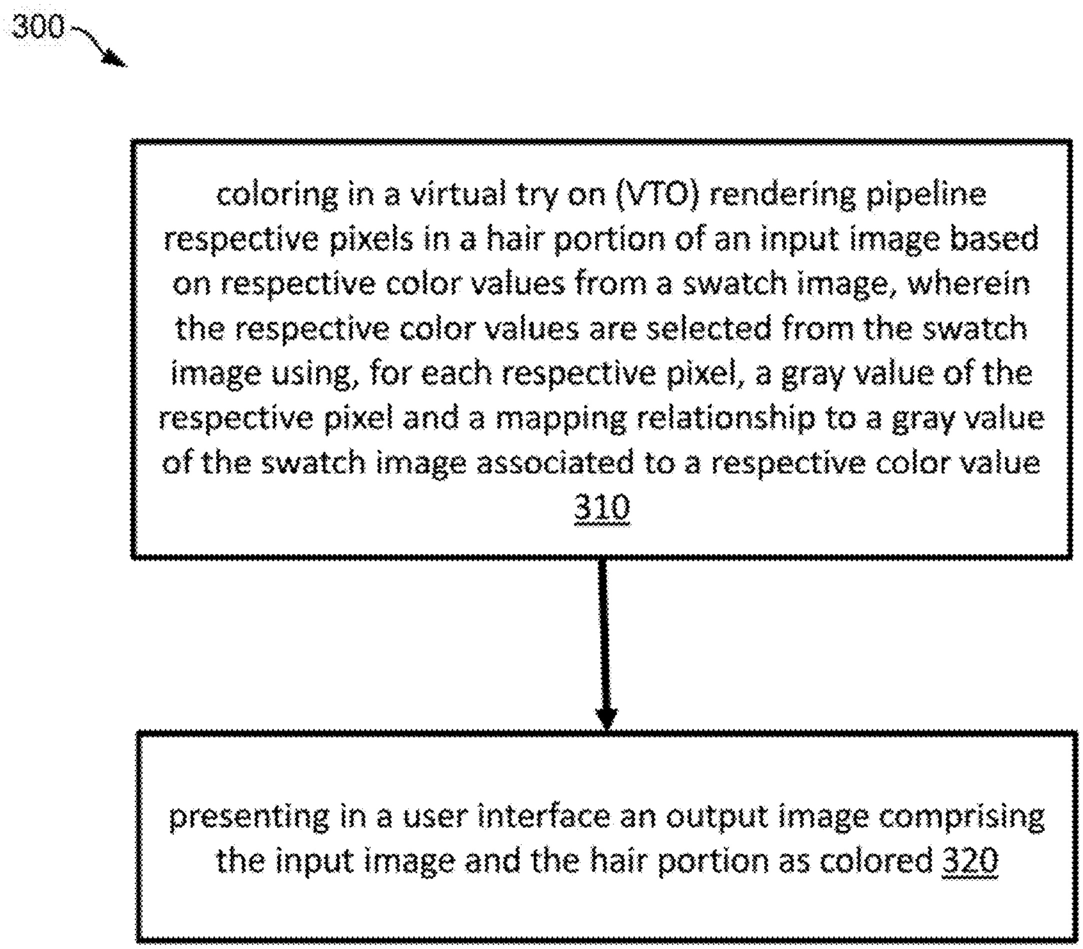
FIG. 5 is a flowchart of operations such as for a computer implemented method in accordance with an embodiment.

Reference is now made to FIG. 5, which shows a computer-implemented method 300 comprising executing on a processor one or more steps. The method 300 may comprise coloring 310 in a VTO rendering pipeline 116 respective pixels in a hair portion 406 of an input image 126 based on respective color values from a swatch image 136, wherein the respective color values are selected from the swatch image 136 using, for each respective pixel, a gray value of the respective pixel and a mapping relationship to a gray value of the swatch image 136 associated to a respective color value. The method 300 may further comprise presenting 320 in a user interface 114 an output image 128 comprising the input image 126 and the hair portion 406 as colored.

The method 300 may further comprise determining the hair portion 406 from the input image 126 via a deep neural network 106B of a hair detection engine.

In another embodiment, a computer-implemented method comprising executing on a processor one or more steps comprising selecting a swatch gray value from a swatch image 136 based on a probability of a hair gray value occurring in a hair portion 406 of an input image 126. The method further comprises coloring a pixel in the hair portion 406 of the input image 126 based on a color value from the swatch image 136 associated with the swatch gray value.

It will be understood that corresponding system embodiments are disclosed for each of the method embodiments disclosed herein, for example where the system comprises respective components having computation circuitry configured to perform the operations of the computer implemented method embodiments.

In addition to computing device and method aspects, a person of ordinary skill will understand that computer program product aspects are disclosed, where instructions are stored in a non-transient storage device (e.g. a memory, CD-ROM, DVD-ROM, disc, etc.) and that, when executed, the instructions cause a computing device to perform any of the method aspects stored therein.

While the computing devices are describe with reference to processors and instructions that, when executed, cause the computing devices to perform operations, it is understood that other types of circuitry than programmable processors can be configured. Hardware components comprising specifically designed circuits can be employed such as but not limited to an application specific integrated circuit (ASIC) or other hardware designed to perform specific functions, which may be more efficient in comparison to a general purpose central processing unit (CPU) programmed using software. Thus, broadly herein an apparatus aspect relates to a system or device having circuitry (sometimes references as computational circuitry) that is configured to perform certain operations described herein, such as, but not limited, to those of a method aspect herein, whether the circuitry is configured via programming or via its hardware design.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A computer-implemented method comprising executing on a processor one or more steps comprising:
- preprocessing a swatch image using a deep neural network to correct accuracy of the coloring therein;
- mapping gray levels from the swatch image and gray levels from a hair portion of an input image by matching their respective frequencies to establish a map relationship between the swatch image and the hair portion, wherein the gray levels of the swatch image are associated to respective swatch color values; and
- coloring a pixel in the hair portion based on a swatch color value determined using a gray level of the pixel and the map relationship.

2. The method of claim 1, further comprising determining the hair portion from the input image via a deep neural network.

3. The method of claim 1, wherein the respective frequencies are probabilities of the gray levels occurring in the swatch image or the hair portion, respectively.

4. The method of claim 1, wherein the frequencies are represented by histograms or by cumulative distribution functions.

5. The method of claim 1, further comprising calculating a mapping table that maps the gray levels from the hair portion to the swatch color values.

6. The method of claim 5, wherein coloring the pixel of the hair portion is performed by a Graphics Processing Unit (GPU) using a shader.

7. The method of claim 6, further comprising providing the mapping table to the shader using a 1D texture.

8. The method of claim 7, further comprising interpolating the mapping table.

9. The method of claim 1, further comprising displaying an output image comprising the input image and the hair portion as colored.

10. The method of claim 9, further comprising:
- processing the input image to define a hair mask for the hair portion; and
- processing the output image using a guided filter, the hair mask and the input image to recalculate edges of the hair portion to smooth the edges and limit a bleeding of hair colouring outside an original hair position from the input image.

11. The method of claim 1, further comprising calculating the frequencies of each of the gray levels in the swatch image; and calculating the frequencies of each of the gray levels in the hair portion of the input image.

12. A system comprising:
- a preprocessing component comprising computational circuitry to modify properties of a swatch image using a deep neural network configured to correct a color accuracy in the swatch image;
- a virtual try on (VTO) rendering pipeline having computational circuitry to color respective pixels in a hair portion of an input image based on respective color values as corrected from the swatch image, wherein the respective color values are selected from the swatch image using, for each respective pixel, a gray value of the respective pixel and a mapping relationship to a gray value of the swatch image associated to a respective color value; and a user interface component to present an output image comprising the input image and the hair portion as colored.

13. The system of claim 12, further comprising a hair detection engine comprising computational circuitry to determine the hair portion from the input image via a deep neural network.

14. The system of claim 12, wherein the VTO comprises a shader to color the respective pixels in the hair portion of the input image.

15. The system of claim 12, further comprising:

hair mask computational circuitry to process the input image to define a hair mask for the hair portion; and a post-processing component comprising computational circuitry to apply a guided filter to the output image, wherein the guided filter uses the hair mask and the input image to recalculate edges of the hair portion to smooth the edges and limit a bleeding of hair colouring outside an original hair position from the input image.

16. A computer-implemented method executing on a processor one or more steps comprising:

preprocessing a swatch image using a deep neural network to correct accuracy of the coloring therein;

coloring in a virtual try on (VTO) rendering pipeline respective pixels in a hair portion of an input image based on respective color values as corrected from the swatch image, wherein the respective color values are selected from the swatch image using, for each respective pixel, a gray value of the respective pixel and a mapping relationship to a gray value of the swatch image associated to a respective color value; and presenting in a user interface an output image comprising the input image and the hair portion as colored.

17. The method of claim 16, further comprising determining the hair portion from the input image via a deep neural network of a hair detection engine.

18. The method of claim 16, wherein the VTO comprises a shader to color the respective pixels in the hair portion of the input image.

* * * * *